(12) United States Patent
Lewis

(10) Patent No.: US 7,813,414 B2
(45) Date of Patent: Oct. 12, 2010

(54) DETECTION APPARATUS AND METHOD

(75) Inventor: Michael Lewis, Märsta (SE)

(73) Assignee: Infineon Technologies AG, Neubiberg (DE)

( * ) Notice: Subject to any disclaimer, the term of this patent is extended or adjusted under 35 U.S.C. 154(b) by 1813 days.

(21) Appl. No.: 10/875,271

(22) Filed: Jun. 24, 2004

(65) Prior Publication Data

US 2005/0008067 A1   Jan. 13, 2005

(30) Foreign Application Priority Data

Jun. 24, 2003   (SE) ................................. 0301836

(51) Int. Cl.
*H04B 1/38* (2006.01)
(52) U.S. Cl. .................. 375/219; 375/145; 375/357; 375/356; 370/328; 370/414; 370/416; 370/445; 370/469
(58) Field of Classification Search ............ 375/340, 375/219, 356, 365, 368, 145, 357; 370/278, 370/292, 389, 390, 395.1, 395.7, 455, 471, 370/395.5, 447, 458, 459, 461, 468, 469, 370/491, 515, 520, 328, 395.65, 414, 416, 370/418, 432, 445; 709/225, 226, 230–237
See application file for complete search history.

(56) References Cited

U.S. PATENT DOCUMENTS

| 5,416,780 | A * | 5/1995 | Patel | 370/347 |
|---|---|---|---|---|
| 6,675,012 | B2 * | 1/2004 | Gray | 455/423 |
| 6,834,045 | B1 * | 12/2004 | Lappetelainen et al. | 370/329 |
| 6,996,074 | B2 * | 2/2006 | Garcia-Luna-Aceves et al. | 370/278 |
| 7,123,662 | B2 * | 10/2006 | Li et al. | 375/260 |
| 7,129,884 | B1 * | 10/2006 | Tehrani et al. | 342/20 |
| 7,397,814 | B2 * | 7/2008 | Ginzburg et al. | 370/445 |
| 2002/0160769 | A1 | 10/2002 | Gray | 455/423 |
| 2003/0016647 | A1 * | 1/2003 | Margon | 370/342 |
| 2003/0091066 | A1 * | 5/2003 | Choi et al. | 370/468 |
| 2003/0206531 | A1 * | 11/2003 | Shpak | 370/320 |

OTHER PUBLICATIONS

Seung Joon Lee et al.; "Acquisition Performance Improvement by Barker Sequence Repetition in a Preamble for DS-CDMA Systems with Symbol-Length Spreading Codes"; IEEE Transactions on Vehicular Technology, vol. 52, No. 1; pp. 127-131, Jan. 2003.
A.J. Han Vinck et al.; "On synchronization for Burst Transmission"; IEICE Trans. Fundamentals, vol. E80A, No. 11; pp. 2130-2135, Nov. 1997.

* cited by examiner

*Primary Examiner*—David C Payne
*Assistant Examiner*—Rahel Guarino
(74) *Attorney, Agent, or Firm*—SpryIP, LLC

(57) ABSTRACT

A transceiver apparatus and a method comprise detecting means for detecting messages, wherein the detecting means comprises a first detector arranged to operate over a first detection period and which output indicates the beginning of a message with a first detection probability, and a second detector arranged to operate over a second detection period and which output indicates the detection of the beginning of a message with a second detection probability. The second detection probability is higher than the first detection probability and the transceiver apparatus is arranged to receive the message if the second detector indicates detection of the beginning of a message.

17 Claims, 3 Drawing Sheets

US 7,813,414 B2

DETECTION APPARATUS AND METHOD

PRIORITY

This application claims priority to Swedish application no. 0301836-3 filed Jun. 24, 2003.

TECHNICAL FIELD OF THE INVENTION

The invention relates generally to an apparatus for detecting messages and a method therefore. More specifically the present invention relates to a transceiver apparatus and a method for detecting the beginning of a message where the detection need to be performed within a first time period for the purpose of deciding if a message may be transmitted and within a second time period for the purpose of deciding if a message should be received.

BACKGROUND OF THE INVENTION

Different schemes, methods and protocols, for communication between nodes in different types of networks are constantly developed to improve the characteristics of the particular network. Oftentimes older, less capable, protocols will have to live side by side with more advanced protocols as older equipment, employing older protocols are slowly phased out and replaced with newer more capable units. Other times different design characteristics may force the use of different protocols side by side for purpose of efficient network design.

In development of new methods, protocols and equipment this knowledge impacts the design as considerations, regarding the capability of the new protocols, methods or equipments to function in an effective manner side by side with the older ones, need to be taken.

For receiver equipment there is generally at least part of the sequence of operation where the receiver must search for the beginning of a valid transmission or message. This is the case most all of the time for multiple-access systems without central coordination, of which one example is IEEE 802.11 wireless LAN (WLAN). In such systems a station is unable to simultaneously transmit and receive messages, and is thus unable to determine if another station began transmission simultaneously and thereby corrupted both transmissions.

A remedy is to employ a so-called "listen before talk" policy based around time-slots. Before transmitting each station must listen for at least one time-slot. If no transmission begins during this time the station may begin transmitting a message at the beginning of the next time-slot. Since a station cannot switch instantaneously from reception to transmission, some time must be reserved for this at the end of the time-slot. For this reason a first time period, called "clear channel assessment time" (CCA time), is defined where other transmissions need to be detected, which leaves a remaining time period in the time-slot for the station to switch to transmission so that transmission can be started at the beginning of the next time-slot. Specifically, a station listening from the start of a time-slot must be able to indicate that it has detected a valid signal within the end of the CCA time with a defined probability set by the specific protocol or standard.

The length of the slot-time defines the granularity of the system, and a shorter slot time means that there is less "dead time" on the air while all stations wait for the right to transmit. However, these slot-times are also chosen based on the possibility to design receiver equipment of reasonably complexity which can meet the detection probability requirements within the given CCA time. For the detection of a signal in the presence of noise, there is a trade-off between the probability of detecting a signal that is present and the probability of a false alarm. A longer detection time allows the noise to be "averaged out", reducing the probability of a false alarm. The detector can then be made more sensitive to the wanted signal.

For the 802.11b standard, operating in the 2.4 GHz frequency band, a slot time of 20 μs was defined, of which 15 μs is allowed for CCA. A transmission should be detected with a 99% probability within the CCA time.

For the 802.11a standard, using OFDM transmission in the 5 GHz frequency band, a slot time of 9 μs was defined, out of which 4 μs is provided for CCA. A somewhat more relaxed detection probability of 90% is allowed to compensate for the shorter CCA time.

The draft 802.11g standard improves the performance over the 802.11b standard by using OFDM modulation in the 2.4 GHz band. However, to be compatible with older 802.11b devices operating in the same band, the basic implementation uses the same 20 μs slot time, diminishing performance compared to 802.11a.

For networks where it is known that legacy devices are not present, it is possible to implement an optional "short slot time" of 9 μs. However, the receiver must be capable of detecting both OFDM transmissions as well as 802.11b Barker-preamble based transmissions within the short 4 μs CCA time. The 4 μs CCA time is a difficult challenge for detection of an 802.11b preamble.

In order to reach even the relaxed detection probability of 90%, the probability of false alarm rises to very high levels. High levels of false alarms damages system performance firstly by indicating that the medium is busy during the slot during which the false alarm occurs, preventing transmission. Secondly and the main problem is, however that the false detection also causes the station to switch into 802.11b reception mode. This prevents transmission of messages and blinds the station to other incoming transmissions, including OFDM transmissions, until a time-out occurs possibly 50-100 μs, or more, later. In a short slot-time system, the dominant transmission format is likely to be OFDM, so it is clearly undesirable to have an 802.11b detection mechanism preventing operation of the station for large periods of time due to false alarms.

SUMMARY OF THE INVENTION

It is a main object of the present invention to provide such apparatus and methods that at least alleviate the above problems of switching wrongly into 802.11 reception mode.

It is in this respect a particular object of the invention to provide such apparatus and methods that reduce the number of false alarms in detecting the beginning of a transmission in a transceiver operating in a multiple-access system without central coordination.

It is still a further object of the invention to provide such apparatus and methods that increase the efficiency of a transceiver which must be capable of indicating the detection of the beginning of a transmission, with defined characteristics, within a defined time period, with a given minimum probability of success, and where said detection period is shorter than the minimum period from the beginning of the transmission, within which it is necessary to begin decoding of the transmission in order to successfully receive the information contained therein.

These objects among others are, according to a first aspect of the present invention, attained by an transceiver apparatus comprising detecting means for detecting messages, wherein said detecting means comprises a first detector arranged to operate over a first detection period and which output indicates the beginning of a message with a first detection probability, and a second detector arranged to operate over a second detection period and which output indicates the detection of the beginning of a message detection with a second detection probability. The second detection probability is higher than the first detection probability and the transceiver apparatus is arranged to receive said message if said second detector indicates detection of the beginning of a message.

The above objects among others are, according to a second aspect of the present invention, attained by a method for detecting the beginning of a message in a transceiver apparatus comprising a detector and a decoder, comprising the steps of detecting, using a first set of detection parameters and a first detection process, the beginning of an incoming message for a first time period; detecting, using a second set of detection parameters and a second detection process, the beginning of said incoming message for a second time period; and decoding said incoming message if said detection during said second time period indicates the presence of said incoming message.

By this arrangement, the first detector detects a preamble in a message according to the specific standard during a first time period. If no message is detected the transceiver apparatus may take different actions. If a message, or rather the preamble of a message, is detected no other actions are taken by the transceiver at this time other than continued detection with the second detector. The second detector works over a second time period, which gives higher detection probability (without increasing the probability of false alarms) and thus a better or more secure decision is reached by the second detector regarding the presence or absence of a message. If the second detector indicates that a message is present the transceiver is switched into reception mode for receiving and decoding the message. If, however, the indication of the first detector was a false alarm, the second detector will, with a higher probability of success, detect this and the transceiver will not be switched into reception mode.

Also, it is possible that the first detector does not detect an incoming messager, although there is a message present on the medium. This may specifically be the case where the first detector is optimised to minimise the number of false alarms, and just meet the detection probability requirements imposed by the applicable protocol or standard. The second detector may then still detect the incoming message, since it is operating over a longer detection period, and switch to reception mode even though the first detector did not indicate the message.

If the transceiver would have switched to reception mode on the indication given by the first detector the transceiver would not have been able to receive a messager, since it was a false alarm, and would be blind to other incoming messages and would not be able to send own outgoing messages for a period of time which is substantially longer than the second time period. Thus, the efficiency of the transceiver apparatus is increased.

According to a preferred embodiment the transceiver apparatus is arranged to transmit a message if said first detector does not indicate a beginning of a message.

If the first detector does not indicate the presence of a message, the medium for transmitting the message, air, in case of wireless communication, cable or fibre, is free for the transceiver to send an outgoing message.

If the transceiver actually transmits a message may also depend on a number of other parameters, such as if a message is available for sending, if the transceiver apparatus is allowed to transmit, etc.

According to a preferred embodiment the first and second detector are arranged to start detection simultaneously. Thus, all time used by the first detector to detect an incoming message is also used by the second detector for verifying the existence of said message. Thus, the second time period comprises the first time period plus extra time, which means that the beginning, or preamble, of the message is detected with a greater probability of success.

According to a preferred embodiment the second detection period is shorter than the time from the beginning of the message to the time where reception of the message need to be started to successfully receive the message.

Thus, the transceiver is allowed time to switch from detection mode to reception mode, if the second detector indicates the presence of a message.

According to a preferred embodiment the first detector is optimized to minimize the number of false message beginning indications while meeting minimum detection requirements.

According to a preferred embodiment the second detector is optimized to maximize the probability of detection of message beginnings while meeting acceptable rates of false positive indications.

The two detectors may be optimised individually to optimise the overall performance of the detection.

According to a preferred embodiment the transceiver apparatus is arranged to receive and transmit messages over a medium, such as air, in case of wireless communication, cable or fibre, and operating using a protocol having time-slots, which are used to decide which, of a number of different transceivers, should be allowed to transmit a message. The first and second detector are arranged to start detecting incoming messages at the start of a defined time-slot. The first detector is arranged to indicate the presence or absence of a message on said medium after a first CCA time (Clear Channel Assessment time), and the second detector is arranged to indicate the presence or absence of a message on said medium after a second CCA time, where the second CCA time being substantially longer than the first CCA time.

If the first detector indicates the absence of a message on the medium, the transceiver is arranged to evaluate if it is allowed to send a message and if so start sending a message in the next time-slot. If no transceiver is sending any messages, the present transceiver has the opportunity to send any outgoing messages.

If the first detector indicates the presence of a message on the medium after the first CCA time, and also the second detector indicates the presence of a message on said medium after the second CCA time, the transceiver is arranged to receive and decode said message presently being transmitted on the medium. Since the first detector indicates that a message is present on the medium, the transceiver continues to detect the message using the second detector to be able to get a more secure evaluation regarding if there actually is a message present on the medium or if the first detector gave a false alarm. The second detector then indicates the presence of the message and the transceiver is switched into reception mode.

It is also possible that the first detector does not detect a message present on the medium, due to the short detection time and that the detector is optimised to minimise the number of false alarms. The second detector may then still detect the message, since the second detector has a higher probability of detecting a message due to the longer time period for detection and possibly being optimised for maximum detection probability, and switch the transceiver into reception mode.

If the first detector indicates the presence of a message on said medium after the first CCA time, and the second detector indicates the absence of a message on the medium after the second CCA time, the transceiver is arranged to start detecting the presence or absence of a message at the start of the next available time-slot. That is, if the first detector gives a false alarm, which the second detector notice, the transceiver will not go into reception mode, but will continue to detect the presence or absence of messages according to what has been described above.

According to a preferred embodiment the transceiver operates in the 2.4 GHz frequency band according to the 802.11 standard and the 802.11g extension to the standard. The first time period and the first CCA time is the CCA time as specified in the 802.11a standard, i.e. 4 µs and the second time period and the second CCA time is the CCA time as specified in the 802.11b standard, i.e. 15 µs.

Further characteristics of the invention and advantages thereof will be evident from the following detailed description and drawings of embodiments of the invention.

BRIEF DESCRIPTION OF THE DRAWINGS

The present invention will become more fully understood from the detailed description of embodiments of the present invention given herein below and the accompanying FIGS. 1 to 4, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Preferred embodiments of the invention will now be described in connection with an implementation of a wireless LAN (WLAN) according to the standard 802.11. The transceivers are intended to operate in an environment where the beginning of a message need to be detected within 4 µs, according to 802.11a for the purpose of transmitting a message, but where substantially longer time exists, 15 µs according to 802.11b, before it is necessary to start receiving a valid message. This additional time may be used to increase the probability that the message indeed is a valid message and not a false alarm. It is, however, clear to the man skilled in the art that the present invention may also be employed in wired networks operating different kinds of standards or protocols, or other wireless network implementations.

Figure 1:
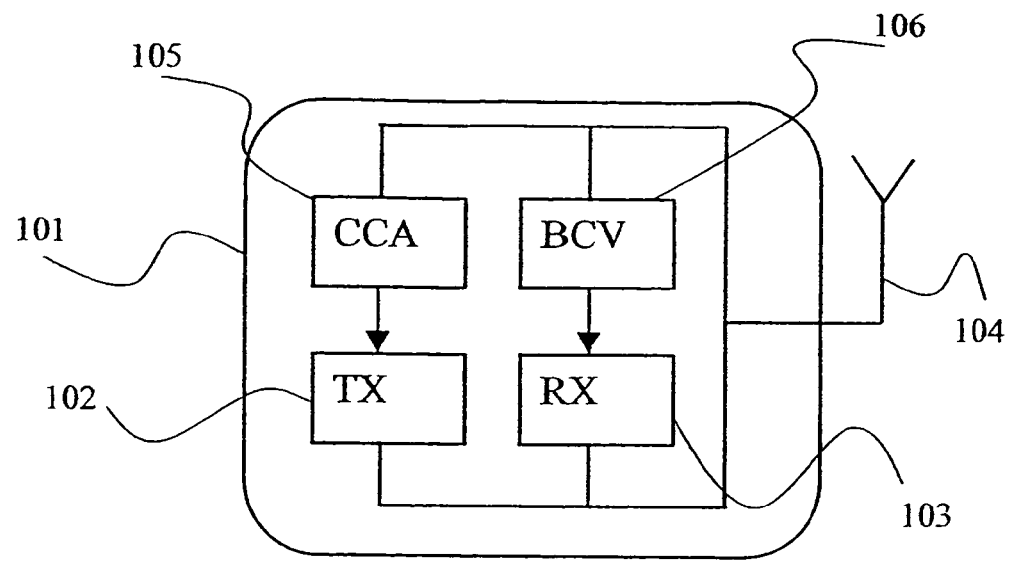
FIG. 1 is a schematic view of a transceiver apparatus according to a preferred embodiment of the invention.

FIG. 1 schematically shows a transceiver apparatus 101 of a preferred embodiment according to the invention. The transceiver is arranged to operate in a wireless LAN (WLAN) environment according to the standard 802.11. A transmitter circuit 102 and a receiver circuit 103 are connected to an aerial 104 for receiving and transmitting messages, respectively. A clear channel assessment (CCA) circuit 105 is logically connected to the transmitting circuit 102 and a barker code validation (BCV) circuit 106 is logically connected to the receiver circuit 103, as will be described in greater detail below. The CCA circuit 105 and the BCV circuit 106 are fed (not shown) with incoming messages through the aerial 104 and the receiver circuit 103.

Figure 2:
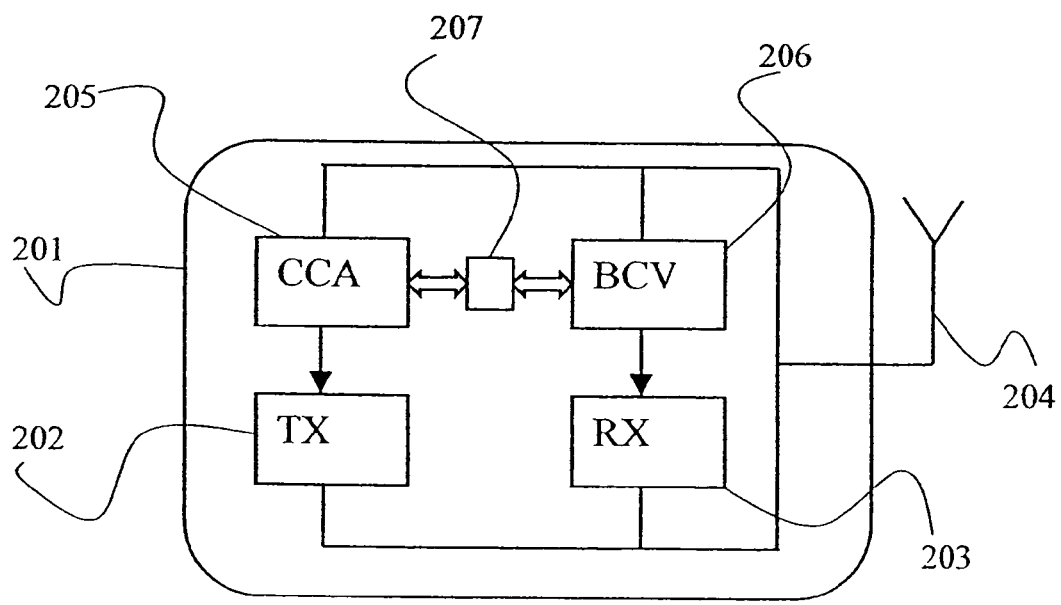
FIG. 2 is a schematic view of a transceiver apparatus according to a preferred embodiment of the invention.

FIG. 2 schematically shows a transceiver apparatus 201 according to another preferred embodiment of the invention. As for the embodiment described in connection with FIG. 1, a transmitter circuit 202 and a receiver circuit 203 are connected to an aerial 204 for receiving and transmitting messages, respectively. A clear channel assessment (CCA) circuit 205 is logically connected to the transmitting circuit 202 and a barker code validation (BCV) circuit 206 is logically connected to the receiver circuit 203. A circuit 207 comprises common functionality shared between the CCA circuit 205 and he BCV circuit 206. The circuit 207 comprises an implementation of the Barker correlator and shared memory. The skilled man realises that the circuit 207 may also comprise other functions, which could be shared between the CCA circuit 205 and the BCV circuit 206.

The operation of the transceiver apparatus will now be described in connection with FIGS. 3 and 4.

Figure 3:
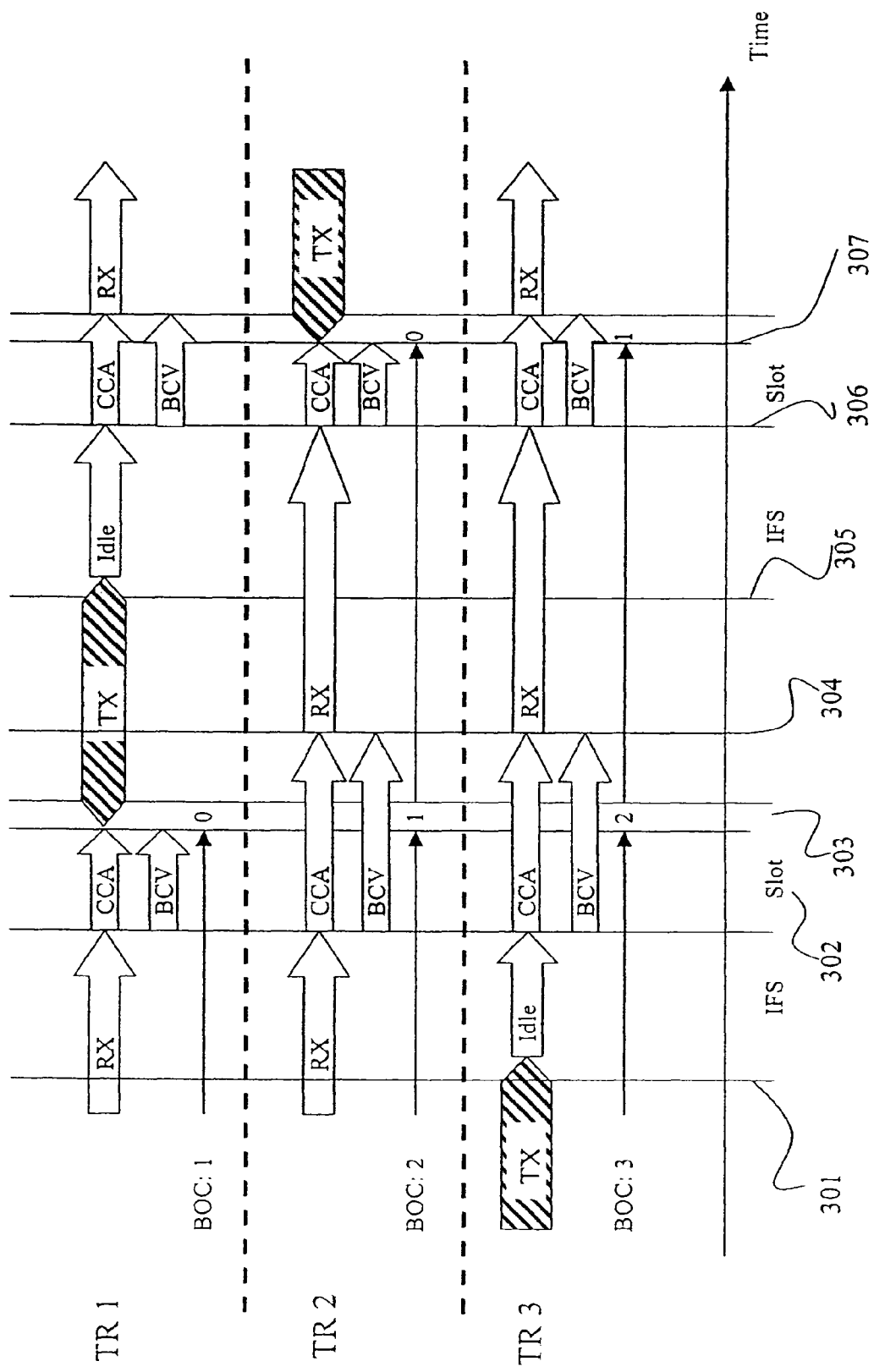
FIG. 3 is a schematic time diagram of the operation of three transceivers according to a preferred embodiment of the invention.

FIG. 3 schematically shows a time diagram over a part of the operation of three transceivers, each being implemented according to preferred embodiments of the invention. It should be clear that the diagram in FIG. 3 is not to scale. Time moves from left to right, but there is no relation between the size of different parts in FIG. 3 and the actual time taken for a specific measure. It should also be clear that FIG. 3 may not correspond to an actual situation but is merely for explanatory purposes.

In FIG. 3, transceiver 3, TR3 is transmitting when we start observing, as can be seen to the far left in FIG. 3. Transceiver 2, TR2, and transceiver 1, TR1, have randomly selected back-off counts, BOC, of 2 and 1, respectively. BOC indicates how many slots the medium must be free before the respective transceiver may transmit a message. At the end of the transmission from TR3 301, all transceivers wait a specified idle time, the "inter-frame space" or IFS, for the medium to be free. After the IFS, the first slot starts 302. During the first slot 302 all transceivers perform a CCA to check if the medium is free. TR1 has a BOC of 1 and is thus scheduled to start transmitting a message if the CCA indicates that the medium is free, directly after the first time slot 302. Since no transmission occurs the CCA is positive and TR1 switches from receive mode to transmit mode for transmitting the message at the start of the next slot 303.

TR2 has a BOC of 2 and thus decrement its BOC at the end of slot 302. Since the BOC is not 0, TR2 continues to do CCA and detects TR1's transmission at the beginning of the next slot 303. Before TR2 switch to receive mode, TR2 continues to do a BCV according to the invention. Since the BCV indicates the presence of a message, TR2 switches to receive mode in due time 304 to be able to decode the message. The BCV is indicated in FIG. 3 to start at the fist slot 302, but may alternatively start at the second slot 303 or at the slot where the CCA indicates the beginning of a transmission. TR2 thus receives the message. When TR1 is finished transmitting a new IFS period starts 305 and after that a new slot 306 begins. All transceivers perform a new CCA, which indicates that the medium is free. TR2 decrements its BOC and is ready to transmit at the start of the next slot 307.

Figure 4:
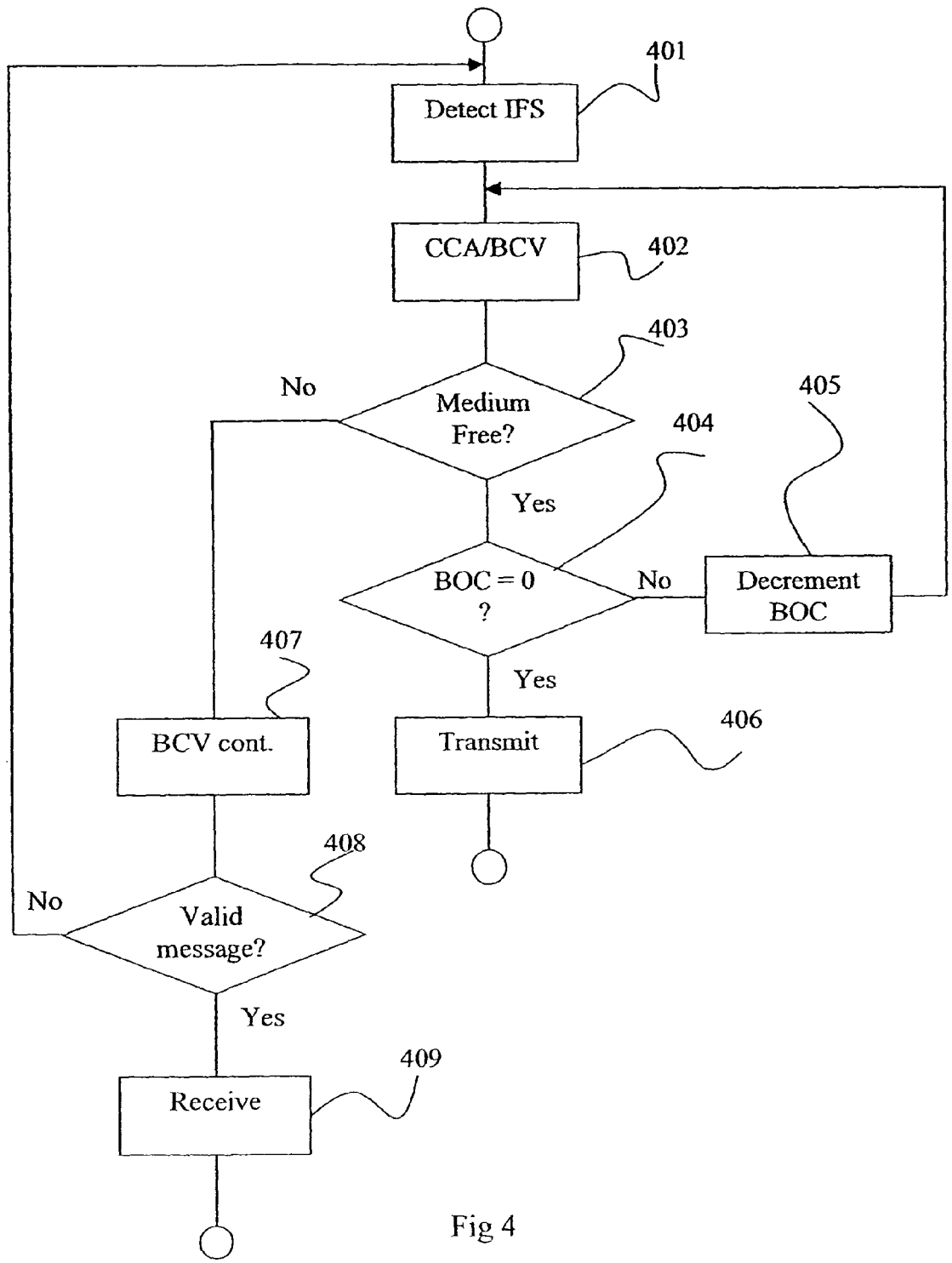
FIG. 4 shows a schematic flow diagram of the operation of a transceiver according to a preferred embodiment of the invention.

FIG. 4 schematically shows a flow diagram of the operation of an embodiment of a transceiver apparatus according to the invention. After the IFS 401, a CCA/BCV is started 402, that is, both CCA and BCV are executed in parallel. The slot time is 9 µs according to the option in 802.11g and the CCA is 4 µs leaving 5 µs for switching to transmit mode for transmitting a message at the start of the next slot. A check is made 403 to see if the CCA result indicates that the medium is free or not. If the medium is free a check is made 404 to see if the back-off counter is 0. If the BOC is not 0 it is decremented in step 405 and the execution returns to CCA 402. If the BOC is 0 the transceiver is switched to transmit mode 406, and a message is transmitted, using OFDM or Barker code message, at the start of the next slot, if a message transmission is due.

If the medium is not free BCV is continued in step 407. A conventional 802.11b receiver requires that the signal is detected (CCA) within 15 µs. It is therefore clear that it is possible to construct an 802.11b receiver that can successfully receive an 802.11b transmission with detection occurring 15 µs into the transmission, and so the barker code validation may continue for 15 µs giving a considerable more reliable indication that the message is valid, than the CCA performed over 4 µs. A check is made 408 to see if the BCV indicates that the message is valid and if so the transceiver is switched into receive mode 409. If the check 408 indicates that the message is not valid, the execution returns to detecting the IFS.

The flow diagram of FIG. 4 shows the typical case where the CCA process successfully detects the start of the transmission. In the case that the CCA process fails to detect the start of the transmission, and assuming that the BOC is non-zero or a transmission is not scheduled, the barker code validation will with a high probability indicate a valid message and trigger reception.

It will be obvious that the invention may be varied in a plurality of ways. Such variations are not to be regarded as a departure from the scope of the invention. All such modifications as would be obvious to one skilled in the art are intended to be included within the scope of the appended claims.

I claim:

1. A transceiver apparatus comprising:
   first means for detecting over a first detection period and providing a first output indicating a beginning of a message with first detection probability,
   second means for detecting over a second detection period being greater than the first detection period and providing a second output indicating the detection of the beginning of the message with a second detection probability, and said second detection period is shorter than the time from the beginning of the message to the time where reception of the message must be started in order to successfully receive the message,
   wherein said second detection probability is higher than said first detection probability, and
   said transceiver apparatus is arranged to receive the message if said second means for detecting indicates detection of the beginning of the message.

2. The transceiver apparatus according to claim 1, wherein said transceiver is arranged to transmit a message if said first means for detecting does not indicate a beginning of a message.

3. The transceiver apparatus according to claim 2, wherein said transceiver is arranged to transmit a message depending on a plurality of additional parameters.

4. The transceiver apparatus according to claim 3, wherein a parameter indicates if a message is available for sending or if the transceiver apparatus is allowed to transmit.

5. The transceiver apparatus according to claim 1, wherein said first and second detection periods have the same start time.

6. The transceiver apparatus according to claim 1, wherein said first means for detecting is optimized to minimize the probability of falsely indicating a message beginning while meeting minimum detection requirements.

7. The transceiver apparatus according to claim 1, wherein said second means for detecting is optimized to maximize the probability of detection of a message beginning while meeting required maximum rates of false positive indications.

8. The transceiver apparatus according to claim 1, arranged to receive and transmit messages over a medium, wherein
   said first and second means for detecting are arranged to start detecting at the start of a defined time-slot,
   said first means for detecting is arranged to indicate the presence or absence of a message on said medium after a first CCA time,
   said second means for detecting is arranged to indicate the presence or absence of a message on said medium after a second CCA time,
   said second CCA time is substantially longer than said first CCA time,
   if said first means for detecting indicates the absence of a message on said medium, said transceiver is arranged to evaluate if said transceiver is allowed to send a message, and if said evaluation is positive, start sending a message in the next time-slot,
   if said first means for detecting indicates the presence of a message on said medium after said first CCA time, and said second means for detecting indicates the presence of a message on said medium after said second CCA time, said transceiver is arranged to receive and decode said message present on said medium, and
   if said first means for detecting indicates the presence of a message on said medium after said first CCA time, and if said second means for detecting indicates the absence of a message on said medium, after said second CCA time, said transceiver is arranged to start detecting the presence or absence of a message at the start of the next available time-slot.

9. A method for detecting the beginning of a message in a transceiver apparatus comprising a detector and a decoder, comprising the steps of:
   detecting, using a first set of detection parameters and a first detection process, the beginning of an incoming message for a first time period,
   detecting, using a second set of detection parameters and a second detection process, the beginning of said incoming message for a second time period, the second time period being greater than the first time period and the second time period is shorter than the time from the beginning of said incoming message to the time where reception of said incoming message must be started in order to successfully receive said incoming message and
   decoding said incoming message if said detection during said second time period indicates the presence of said incoming message.

10. The method according to claim 9, wherein said transceiver apparatus further comprises a transmitter and the further step of:

starting transmission of a message if a message is ready for transmission and if said detection during said first time period indicates that no message is received.

11. The method according to claim 9, wherein said first and second detection process start detecting incoming messages simultaneously.

12. The method according to claim 10, wherein said first and second detection process start detecting incoming messages simultaneously.

13. A transceiver apparatus comprising:

a first detector arranged to operate over a first detection period, wherein the output from said first detector indicates the beginning of a message with a first detection probability, a second detector arranged to operate over a second detection period being greater than said first detection period and said second detection period is shorter than the time from the beginning of the message to the time where reception of the message must be started in order to successfully receive the message, wherein the output from said second detector indicates the detection of the beginning of the message with a second detection probability, said second detection probability is higher than said first detection probability, and wherein said transceiver apparatus is arranged to receive said message if said second detector indicates detection of the beginning of the message.

14. The transceiver apparatus according to claim 13, wherein said transceiver is arranged to transmit a message if said first detector does not indicate a beginning of a message.

15. The transceiver apparatus according to claim 14, wherein said transceiver is arranged to transmit a message depending on a plurality of additional parameters.

16. The transceiver apparatus according to claim 13, wherein said first and second detection periods have the same start time.

17. The transceiver apparatus according to claim 13, wherein said first detector is optimized to minimize the probability of falsely indicating a message beginning while meeting minimum detection requirements.

* * * * *